United States Patent [19]

Dreveton et al.

[11] Patent Number: 5,744,428
[45] Date of Patent: Apr. 28, 1998

[54] PROCESS USING GELLAN AS A FILTRATE REDUCER FOR WATER-BASED DRILLING FLUIDS

[75] Inventors: Eric Dreveton, Chanopost; Jacqueline Lecourtier, Rueil Malmaison; Daniel Ballerini, St Germain En Laye; Lionel Choplin, Nancy, all of France

[73] Assignee: Institut Francais Du Petrole, Rueil-Malmaison, France

[21] Appl. No.: 632,315

[22] Filed: Apr. 15, 1996

Related U.S. Application Data

[63] Continuation of Ser. No. 362,859, Dec. 23, 1994, abandoned.

[30] Foreign Application Priority Data

Dec. 24, 1993 [FR] France ................................ 93 15719

[51] Int. Cl.$^6$ .................................................. C09K 7/02
[52] U.S. Cl. ........................... 507/110; 507/113; 507/114; 507/120
[58] Field of Search ..................... 507/110, 111, 507/209, 213, 113, 114, 120

[56] References Cited

U.S. PATENT DOCUMENTS

| | | |
|---|---|---|
| 3,933,788 | 1/1976 | Kang et al. . |
| 4,503,084 | 3/1985 | Baird et al. ........................ 426/573 |
| 4,981,520 | 1/1991 | Hoskin et al. . |
| 5,238,065 | 8/1993 | Mondshine et al. ............... 507/110 |
| 5,253,711 | 10/1993 | Mondshine ........................ 507/110 |
| 5,362,312 | 11/1994 | Skaggs et al. ..................... 106/189 |
| 5,376,396 | 12/1994 | Clark ................................. 426/573 |
| 5,514,644 | 5/1996 | Dobson ............................. 507/110 |

FOREIGN PATENT DOCUMENTS

| | | |
|---|---|---|
| 0 012 552 | 6/1980 | European Pat. Off. . |
| 0 058 917 | 9/1982 | European Pat. Off. . |
| 0 209 277 | 1/1987 | European Pat. Off. . |
| 0 453 366 | 10/1991 | European Pat. Off. . |
| 0 561 504 | 9/1993 | European Pat. Off. . |
| 1 416 013 | 12/1975 | United Kingdom . |
| 2 058 106 | 4/1981 | United Kingdom . |
| 2 271 572 | 4/1994 | United Kingdom . |

*Primary Examiner*—Philip Tucker
*Attorney, Agent, or Firm*—Millen, White, Zelano, & Branigan, P.C.

[57] ABSTRACT

The present invention relates to a process for controlling the permeability of the walls of the geologic formations drilled. The circulating drilling fluid includes a determined amount of gellan used as a filtrate reducer.

In the process, the viscosity of the fluid is mainly controlled by polymers, such as xanthan, scleroglucan or wellan.

The invention further relates to a drilling fluid including gellan.

17 Claims, No Drawings

PROCESS USING GELLAN AS A FILTRATE REDUCER FOR WATER-BASED DRILLING FLUIDS

This application is a continuation of application Ser. No. 08/362,859, filed Dec. 23, 1994, now abandoned.

FIELD OF THE INVENTION

The present invention relates to the field of drilling operations performed in order to develop underground reservoirs containing hydrocarbon. More particularly, the invention describes a process for controlling filter losses of a fluid circulating in a well drilled through geologic formations.

BACKGROUND OF THE INVENTION

The conventional drilling technique comprises the circulation of a fluid injected towards the well bottom through the drill string, the fluid flowing up towards the surface in the annulus defined by the walls of the well and the outside of the drill string. During the upflow and during drilling, a certain amount of drilling fluid enters the porous or fractured geologic formations. This lost amount of fluid is called a filter loss or filtrate. It is generally desirable to limit the amount of filtrate because it represents a costly basic products consumption, additional control and conditioning operations in the mud conditioning facility, and also risks of destabilization of the well walls or of clogging of the geologic producing or potentially producing zones.

Many filtrate reducing products for water-based fluids, be they drilling fluids, completion fluids or workover fluids, are known in the profession. The use of organic colloids such as starch, carboxymethylcellulose (CMC) or polyanionic cellulose (PAC) may for example be cited.

Documents U.S. Pat. No. 4,326,052, U.S. Pat. No. 4,377,636 and U.S. Pat. No. 4,385,123 describe the polysaccharide S-60 called gellan whose use in an aqueous solution as a thickening, gelling and stabilizing agent is well-known in the fields of food industry, paints or adhesives.

SUMMARY OF THE INVENTION

The present invention thus relates to a process used in a well drilled through at least one geologic formation having a given permeability, said process comprising circulating a water-based fluid in said well. In this process, the permeability of the walls of said well drilled in said formation is controlled by adding a determined mount of gellan in said fluid.

The gellan may mainly consist of native gellan.

The fluid may contain between 0.5 and 10 grams per liter of gellan and preferably less than 5 g/liter.

The viscosity of said fluid may be mainly controlled by adding at least one polymer, said polymer being selected from the group made up of xanthan, scleroglucan, wellan, hydroxyethylcellulose (HEC), CMC, guar gum and the polyacrylamides.

The invention also relates to a water-based drilling fluid, whose filtrate is controlled by adding a determined amount of gellan.

The viscosity of the fluid may be mainly controlled by adding at least one polymer, said polymer may be selected from the group made up of xanthan, scleroglucan, wellan, hydroxyethylcellulose (HEC), CMC, guar gum and the polyacrylamides.

The fluid may contain between 0.5 and 10 grams/liter of gellan and between 1 and 10 grams/liter of scleroglucan or xanthan.

The gellan is mainly native gellan.

Gellan is an exocellular polysaccharide produced by the bacterium *Auromonas elodea* (ATCC 31461) previously classified as *Pseudomonas elodea*. This bacterium has been isolated from plant tissues (*elodea*) collected in Pennsylvania. The bacterium has been characterized by Kang and Veeder and described in U.S. Pat. No. 4,326,053. Gellan is produced by aerobic fermentation. The description of the product and of a process for obtaining it is disclosed in documents U.S. Pat. No. 4,326,052, U.S. Pat. No. 4,326,053, U.S. Pat. No. 4,377,636 and U.S. Pat. No. 4,385,123.

Three main gellan kinds are easily accessible and only one is currently marketed. Differences between these products are due to the nature of the postfermentative treatment performed. Native gellan is obtained directly from the fermentation must after heating thereof at 95° C. for 5 minutes and precipitation with isopropyl alcohol. The second product, called deesterified product, is identical to the previous one, but when the fermentation must is at 95° C., the pH value is brought to 10 with soda or potash and kept at this value for 10 minutes. The solution is thereafter neutralized by sulfuric acid, then the product is precipitated with alcohol. This treatment causes the rapture of the ester bonds of the substituents of the native polysaccharide which contains an acetate and a glycerate. The last product, marketed under the trade name GELRITE or KELCOGEL by the MERK & Co Company (USA), is the deesterified and clarified gellan. While unclarified gellan is made up of nearly 50% of insoluble material consisting mainly of whole cells and of cellular fragments, these impurities are in this case removed from the deesterified product by centrifugation or filtration at 70° C.

The three gellan kinds have different gelling properties. The deesterified and clarified product and the only deesterified product display no noticeable difference. On the other hand, there are many differences between native gellan and deesterified gellan. Native gellan forms an elastic and soft gel whereas deesterified gellan forms a fragile and firm gel. Furthermore, native gellan comprising side chains is easier to solubilize than deesterified gellan. Finally, native gellan shows no hysteresis with respect to temperature, i.e. the properties of the gel are identical, at the same temperature, while setting or while melting. This is described by Moorhouse et al. (1981) in "PS-60: a new gel-forming polysaccharide, in solution properties of polysaccharides", David A. Brant (ed), American Chemical Society Symposium series n°150, Washington, D.C., 111–123.

A mixture of native gellan and of deesterified gellan allows to obtain a whole range of gels having intermediate characteristics between those of the gels obtained from these two products, according to Sanderson et al. (1988), Gellan gum in combination with other hydrocolloids, in "Gums and stabilizers for the food industry 4", Phillips, G. O.; Williams, P. A. and Wedlock, D. J. (ed), IRL Press, Oxford Washington, D.C., USA, 301–308.

The behaviour of a polysaccharide solution directly depends on the conformation state of the polymer chains.

The native gellan solutions show, from a certain polysaccharide concentration, the characteristics of a transient "pseudogel" lattice resulting from weak associations between the double helices formed by the polysaccharide strands. This hypothesis suggests the presence of rod aggregates, or of microgels.

The rheological characteristics of a gellan solution thus strongly depend on the temperature of the solution and on the salt and polysaccharide concentrations.

According to the present invention, the applicant has noted that gellan has good characteristics as a filtrate reducer in water-based drilling fluids. Native gellan, which has an attractive gel quality and a good solubility, is preferably used. It should be noted that the amounts by weight of native gellan used in the tests hereafter include cellular fragments or other non soluble residues. The real polysaccharide rate is about 50% of the amounts added.

However, other gellan kinds are not excluded from the invention, notably in the form of a mixture with native gellan.

The tests hereafter show the characteristics of native gellan in solution, under conditions allowing its properties to be compared to other products used in the profession to obtain a result of the same nature.

A characteristic referred to as "specific filtered volume" and called VFS has been calculated. It represents the slope (a) of the filtration law as a function of time t (filtered volume=$a.t^{1/2}+b$) divided by the surface of the filter in $cm^2$. The VFS unit is thus: $ml/t^{1/2}/cm^2$.

Filtration tests have been carried out according to the API standards in force (API RP 13 B1 section 3 - Filtration - June 1990), except as otherwise provided. The filtered volume or filtrate, measured in milliliter, after 30 minutes and 7.5 mutes, is noted respectively 30' and 7.5'. The gels 0 and 10 (g0 and g10), which characterize the thixotropical properties of the fluid, correspond to measurings achieved with a Fann type viscosimeter, standardized by API, as well as the procedures applied. The plastic viscosity (VP) and the yield value (YV), which characterize the rheological behaviour of the formulations, are calculated from measurements at 600 and 300 rpm with the same type of Farm viscosimeter. VP and YV are conventionally expressed respectively in centipoise and in $lb/100 ft^2$. The characteristic of the cake is given by its thickness in millimeter.

Salinities are noted according to the following convention: for example, Na10 stands for 10 g/liter of NaCl. Na5Ca5 represents 5 g/liter of NaG1 and 5 g/liter of $CaCl_2$.

The gellan used in the following tests has been obtained under the conditions described in document U.S. Pat. No. 4,326,052. Native gellan is used for all the tests.

The clay used is Greenbond from the CKS Company. The CMC used bears reference number R110 and is manufactured by the AQUALON Company.

TESTS

The same method of preparation of the test fluids, i.e. the mixture of water, clay, electrolyte and polymer, has been used for all the tests. The procedure consists notably in adding the electrolytes after swelling of the clay or of the polymers in distilled water.

Test No. 1: Influence of Stirring on the Shear Resistance of Gellan

The aqueous solution contains 1.5 g/l of native gellan, 30 g/l of Green Bond clay and 10 g/l of NaCl. HB2, HB5 and HB20 represent respectively stirring for 2, 5 and 20 minutes in a Hamilton Beach type agitator. The homogenization conditions with the Hamilton Beach agitator correspond to the API standard section 11 OCMA grade bentonite (1970).

|   | VFS | 30' | 7.5' | g0 | g10 |
|---|---|---|---|---|---|
| HB2 | 0.0652 | 15.4 | 7.3 | 10.2 | 18 |
| HB5 | 0.0639 | 15.2 | 7.2 | 10.0 | 19 |
| HB20 | 0.0624 | 14.7 | 7.0 | 11.5 | 19 |
| Shaker | 0.0657 | 15.4 | 7.3 | 8.0 | 16 |
| Magnet.Agit. | 0.0708 | 16.9 | 7.6 | 9.0 | 15 |

The structure of the gellan is not modified by the stirring condition.

Test No.2: Effects of Low-concentration Salts on Gellan The aqueous solution contains gellan and 30 g/l of Green Bond clay.

| Salinity | Na0 | Na5 | Na10 |
|---|---|---|---|
| \* Gellan concentration: 0 g/l. | | | |
| VFS | 0.091 | 0.135 | 0.145 |
| 30' | 22.0 | 34.2 | 36.5 |
| 7.5' | 11.3 | 17.0 | 18.0 |
| g0 | 3.0 | 2.5 | 2.5 |
| g10 | 3.0 | 2.5 | 8.0 |
| Cake | 2.0 | 2.5 | 2.75 |
| VP | 5 | 9.3 | 9.5 |
| YV | 1 | — | — |
| \* Gellan concentration: 0.5 g/l. | | | |
| VFS | 0.074 | 0.091 | 0.088 |
| 30' | 18.0 | 21.8 | 22.3 |
| 7.5' | 9.0 | 11.5 | 12.0 |
| g0 | 1.5 | 6.0 | 7.0 |
| g10 | 2.5 | 10.0 | 12.5 |
| Cake | 2.0 | 1.5 | 1.5 |
| VP | 9 | 6.5 | 5 |
| YV | 6 | 7.5 | 8.5 |
| \* Gellan concentration: 1.5 g/l. | | | |
| VFS | 0.065 | 0.063 | 0.067 |
| 30' | 14.7 | 15.0 | 16.1 |
| 7.5' | 6.9 | 7.2 | 7.7 |
| g0 | 6.0 | 8.5 | 9.5 |
| g10 | 11.0 | 12.5 | 11.5 |
| Cake | 1.5 | 1.5 | 1.5 |
| VP | 20 | 12.5 | 9 |
| YV | 12.5 | 17 | 17 |
| \* Gellan concentration: 3 g/l. | | | |
| VFS | 0.053 | 0.049 | 0.049 |
| 30' | 12.0 | 11.3 | 11.9 |
| 7.5' | 5.4 | 5.3 | 5.7 |
| g0 | 12.0 | 23.0 | 25.0 |
| g10 | 24.0 | 37.0 | 34.0 |
| Cake | 1.0 | 1.0 | 1.0 |
| VP | 27 | 20.5 | 16 |
| YV | 32 | 37.5 | 42 |

Notes

The formulations containing gellan are homogeneous and stable after several weeks.

Gellan allows the filtrate volume to be decreased. These capacities are independent of the ionic strength of the formulations for low salinities.

Addition of gellan allows the thickness of the cake formed by filtration to be significantly reduced.

The fluids have a marked thixotropic feature which increases with the salinity.

Test No.3: Effects of High Concentration Salts on the Formulations Containing Gellan The aqueous solution contains gellan and 30 g/l of Green Bond clay.

| * Polymer concentration: 0 g/l. | | |
| --- | --- | --- |
| Salinity | Na50 | Na5Ca5 |
| VFS | 0.366 | 0.379 |
| 30' | 89.9 | 94.5 |
| 7.5' | 44.5 | 47.5 |
| g0 | 4.0 | 4.5 |
| g10 | 7.0 | 3.5 |
| Cake | 5.0 | 5.0 |
| VP | 2.5 | 7.5 |
| YV | 5.5 | 3 |

| * Gellan concentration: 3 g/l. | | | | |
| --- | --- | --- | --- | --- |
| Salinity | Na30 | Na50 | Na5Ca1 | Na5Ca5 |
| VFS | 0.063 | 0.092 | 0.046 | 0.0745 |
| 30' | 15.4 | 22.6 | 11.0 | 18.3 |
| 7.5' | 7.55 | 11.3 | 5.2 | 9.1 |
| g0 | 14.0 | 11.0 | 17.5 | 11.0 |
| g10 | 16.0 | 13.0 | 25.0 | 14.0 |
| Cake | 1.0 | 1.5 | 1.0 | 1.0 |
| VP | 12 | 7.5 | 16.5 | 9 |
| YV | 23 | 17 | 31 | 22 |

| * Gellan concentration: 6.3 g/l. | | | |
| --- | --- | --- | --- |
| Salinity | Na10 | Na50 | Na5Ca5 |
| VFS | 0.034 | 0.071 | 0.061 |
| 30' | 8.1 | 16.5 | 15.0 |
| 7.5' | 3.70 | 7.6 | 7.3 |
| g0 | 47.0 | 21.0 | 31.0 |
| g10 | 149.0 | 21.0 | 31.0 |
| Cake | 1.0 | 1.0 | 1.0 |
| VP | 30 | 12 | 25 |
| YV | 100 | 39 | 74 |

Note

With a high ionic strength or in the presence of calcium, the filtered volumes increase, but the filtration gain with respect to a fluid without polymer is high (70 to 80%).

Test No.4: Comparison With a Formulation Containing CMC

The aqueous solution contains 3 g/l of CMC and 30 g/l of clay.

| Salinity | Na0 | Na5 | Na10 | Na50 | Na5Ca5 |
| --- | --- | --- | --- | --- | --- |
| VFS | 0.059 | 0.052 | 0.053 | 0.096 | 0.178 |
| 30' | 13.4 | 12.2 | 13.0 | 23.8 | 44.4 |
| 7.5' | 6.4 | 5.8 | 6.6 | 12.0 | 22.4 |
| g0 | 2.0 | 2.5 | 2.0 | 6.0 | 11.0 |
| g10 | 2.0 | 6.0 | 7.0 | 12.0 | 14.0 |
| Cake | 1.0 | 1.0 | 1.5 | 2.0 | 3.0 |

The results are similar to those obtained with gellan. Gellan is nevertheless less sensitive to divalent ions and produces more viscous and more thixotropic fluids. Besides, the cakes formed with gellan are freer than with CMC at high ionic strengths.

Test No.5: Influence of Temperature

The aqueous solution contains 3 g/l of gellan, 10 g/l of NaCl and 30 g/l of Green Bond clay. Filtration is measured in a HP-HT filter press, for example manufactured by the Baroid Company. The surface of the filter is half of the surface of the API filter press. The test differential pressure is 35 bars with a 15-bar back pressure.

| Temperature | 30 | 50 | 70 | 90 | 110 |
| --- | --- | --- | --- | --- | --- |
| VFS | 0.053 | 0.056 | 0.075 | 0.086 | 0.094 |
| 30' | 6.6 | 7.2 | 9.2 | 11.9 | 12.8 |
| 7.5' | 3.3 | 3.6 | 4.5 | 6.3 | 6.8 |
| Cake | 1.0 | 1.0 | 1.0 | 1.0 | 1.0 |

Note

The filtrate volume is independent of the differential pressure applied.

The VFS increases with the temperature but it remains low even at 110° C.

The following tests have not been carried out in the presence of clay.

Test No.6: Solution Without Clay, Gellan Alone, With Scleroglucan or Xanthan or Wellan

| * Gellan alone, NaCl concentration: 10 g/l. | | | |
| --- | --- | --- | --- |
| Gellan | 1.5 | 3.0 | 5.0 |
| VFS | 0.16 | 0.131 | 0.11 |
| 30' | 43.0 | 30.0 | 24.0 |
| 7.5' | 21.5 | 12.0 | 9.5 |
| g0 | 1.0 | 4.0 | 9.0 |
| g10 | 1.0 | 5.0 | 10.0 |
| Cake | 0.5 | 0.5 | 1.0 |
| VP | 3.5 | 6 | 14 |
| YV | 3 | 8 | 26 |

| Gellan | 0 | 1.5 | 3.0 | 5.0 |
| --- | --- | --- | --- | --- |
| * Scleroglucan concentration: 4.5 g/l, NaCl concentration: 10 g/l. | | | | |
| VFS | 0.113 | 0.071 | 0.061 | 0.066 |
| 30' | 165.0 | 19.7 | 13.7 | 14.9 |
| 7.5' | 151.0 | 10.7 | 5.5 | 6.4 |
| g0 | 16.0 | 19.0 | 25.0 | 38.0 |
| g10 | 19.0 | 24.0 | 31.0 | 46.0 |
| Cake | 0.25 | 0.75 | 1.0 | 1.0 |
| VP | 4 | 6 | 8 | 12 |
| YV | 18 | 24 | 39 | 55 |
| * Wellan concentration: 3 g/l, NaCl concentration: 10 g/l. | | | | |
| VFS | 0.097 | 0.100 | 0.099 | 0.080 |
| 30' | 38.0 | 25.1 | 22.2 | 17.3 |
| 7.5' | 23.8 | 11.6 | 9.0 | 6.6 |
| g0 | 6.0 | 9.0 | 15.0 | 30.0 |
| g10 | 6.0 | 10.0 | 21.0 | 35.0 |
| Cake | 0.25 | 0.5 | 0.75 | 0.75 |
| VP | 6.5 | 7 | 16 | 21 |
| YV | 8 | 19 | 28 | 63 |
| * Xanthan concentration: 3 g/l. | | | | |
| VFS | infinite | 0.096 | 0.088 | 0.080 |
| 30' | | 24.3 | 21.5 | 18.1 |
| 7.5' | | 7.5 | 9.9 | 11.3 |
| g0 | 6.0 | 10.0 | 16.0 | 20.0 |
| g10 | 8.0 | 13.0 | 18.0 | 29.0 |
| Cake | | 0.5 | 1.0 | 1.0 |
| VP | 4 | 6 | 9 | 13 |
| YV | 11 | 19 | 32 | 55 |

Notes

The fluids containing gellan and a viscosity improving agent produce VFS values comparable to those obtained with clay.

The cakes formed are thin and homogeneous.

The solutions obtained are thixotropic.

Addition of gellan allows formation of a cake with no initial filtrate loss.

Test No.7: Solution Without Clay, Gellan With Scleroglucan.

| * Gellan concentration: 3 g/l, NaCl concentration: 10 g/l. | | | | |
|---|---|---|---|---|
| Scleroglucan | 0 | 3.0 | 4.5 | 6.0 |
| VFS | 0.141 | 0.078 | 0.060 | 0.060 |
| 30' | 33.3 | 18.7 | 12.2 | 14.7 |
| 7.5' | 15.35 | 8.6 | 6.9 | 6.4 |
| g0 | 5.0 | 20.0 | 27.0 | 34.0 |
| g10 | 9.0 | 24.0 | 36.0 | 42.0 |
| Cake | 0.5 | 0.5 | 0.5 | 0.25 |
| VP | 9 | 10 | 12 | 12 |
| YV | 11 | 29 | 35 | 46 |

The VFS value decreases with the scleroglucan concentration and remains constant from 4.5 g/l.

Test No.8: Solution Without Clay, Influence of Salinity

The aqueous solution contains 3 g/l of gellan and 4.5 g/l of scleroglucan.

| Salinity | Na0 | Na5 | Na10 | Na30 |
|---|---|---|---|---|
| VFS | 0.087 | 0.066 | 0.056 | 0.058 |
| 30' | 29.8 | 20.9 | 12.7 | 13.6 |
| 7.5' | 19.1 | 12.3 | 5.2 | 6.0 |
| g0 | 37.0 | 26.0 | 24.0 | 24.0 |
| g10 | 54.0 | 31.0 | 29.0 | 29.0 |
| Cake | 1.0 | 0.5 | 0.5 | 0.5 |
| VP | 21 | 13 | 13 | 11 |
| YV | 55 | 40 | 35 | 39 |

| Salinity | Na50 | Na5Ca1 | Na5Ca5 |
|---|---|---|---|
| VFS | 0.056 | 0.061 | 0.056 |
| 30' | 13.2 | 13.8 | 12.6 |
| 7.5' | 5.9 | 6.9 | 5.2 |
| g0 | 23.0 | 25.0 | 25.0 |
| g10 | 29.0 | 31.0 | 29.0 |
| Cake | 0.75 | 1.0 | 0.5 |
| VP | 12 | 12 | 12 |
| YV | 36 | 42 | 42 |

Notes

With a low salinity (<=5 g/l of NaCl), the cake forms with some delay.

With a high salinity or in the presence of calcium, no spurt loss is observed and the VFS and the thixotropy are independent of the salinity of the solutions. The spurt loss may be defined as the volume of fluid filtered in the formation prior to the formation of a sufficiently impermeable cake.

Test No.9: Influence of Temperature on a Clayless Solution of Gellan and Scleroglucan, at Various Salinities.

The test conditions are identical to those of Test No. 5.

| Temperature | 30 | 50 | 70 | 90 | 110 |
|---|---|---|---|---|---|
| * The aqueous solution contains 3 g/l of gellan, 4.5 g/l of scleroglucan and 10 g/l of NaCl. | | | | | |
| VFS | 0.104 | 0.120 | 0.143 | 0.204 | infinite |
| 30' | 10.2 | 13.5 | 14.0 | 47.0 | |
| 7.5' | 4.2 | 7.3 | 6.7 | 36.4 | |
| g0 | 22.0 | | | | |
| g10 | 31.0 | | | | |
| Cake | 1.0 | 1.5 | 1.0 | 1.0 | |
| VP | 12 | | | | |
| YV | 39 | | | | |
| * The aqueous solution contains 3 g/l of gellan, 4.5 g/l of scleroglucan and 10 g/l of NaCl and 5 g/l of CaCl$_2$. | | | | | |
| VFS | 0.083 | 0.125 | 0.142 | 0.171 | infinite |
| 30' | 8.2 | 12.2 | 14.4 | 21.3 | |
| 7.5' | 3.2 | 5.2 | 6.7 | 2.7 | |
| g0 | 22.0 | | | | |
| g10 | 27.0 | | | | |
| Cake | 1.0 | 1.0 | 1.0 | 1.0 | 1.0 |
| VP | 11 | | | | |
| YV | 36 | | | | |

| Temperature | 30 | 90 | 100 | 110 |
|---|---|---|---|---|
| * The aqueous solution contains 3 g/l of gellan, 4.5 g/l of NaCl and 5 g/l of FeCl$_3$. | | | | |
| VFS | 0.066 | 0.143 | 0.157 | infinite |
| 30' | 11.9 | 18.7 | 30.6 | |
| 7.5' | 5.3 | 8.7 | 19.0 | |
| g0 | 12.0 | | | |
| g10 | 17.0 | | | |
| Cake | 1.0 | 1.0 | 1.0 | |
| VP | 7 | | | |
| YV | 18 | | | |

Notes

The VFS value increases with the filtration temperature.

The VFS value decreases when passing from the monovalent to the divalent, then to the tervalent ion.

A spurt loss phenomenon is observed at 90° C. for formulations containing monovalent and divalent ions and, at 110° C., no cake forms.

With the tervalent ions, a spurt loss is observed at 100° C. and no cake forms at 110° C.

Test No. 10: Influence of Temperature on a Clayless Solution of Gellan and Scleroglucan in the Presence of High CaCl$_2$ or K$_2$CO$_3$ Concentrations

| Temperature | 30 | 50 | 70 | 90 | 100 | 115 | 130 |
|---|---|---|---|---|---|---|---|
| * The aqueous solution contains 3 g/l of gellan, 4.5 g/l of scleroglucan and 50 g/l of CaCl$_2$. | | | | | | | |
| VFS | 0.084 | 0.114 | 0.141 | 0.162 | 0.169 | 0.171 | infinite |
| 30' | 9.4 | 12.9 | 16.6 | 19.8 | 20.2 | 24.9 | |
| 7.5' | 3.7 | 5.8 | 8.0 | 9.8 | 9.8 | 14.5 | |
| g0 | 8.0 | | | | | | |
| g10 | 12.0 | | | | | | |
| Cake | 0.75 | 0.75 | 1.0 | 1.0 | 0.5 | 0.75 | |
| VP | 7 | | | | | | |
| YV | 12 | | | | | | |
| * The aqueous solution contains 3 g/l of gellan, 4.5 g/l of scleroglucan and 50 g/l of K$_2$CO$_3$. | | | | | | | |
| VFS | 0.081 | 0.108 | 0.122 | 0.168 | 0.184 | 0.238 | infinite |
| 30' | 9.1 | 12.0 | 14.1 | 21.5 | 23.4 | 52.2 | |
| 7.5' | 3.7 | 5.5 | 6.3 | 11.1 | 11.5 | 36.1 | |
| g0 | 17.0 | | | | | | |
| g10 | 24.0 | | | | | | |

-continued

| Temperature | 30 | 50 | 70 | 90 | 100 | 115 | 130 |
|---|---|---|---|---|---|---|---|
| * The aqueous solution contains 3 g/l of gellan, 4.5 g/l of scleroglucan and 50 g/l of CaCl$_2$. ||||||||
| Cake | 0.5 | 0.5 | 0.5 | 0.5 | 0.5 | | |
| VP | 19 | | | | | | |
| YV | 20 | | | | | | |

In the presence of a high salt concentration, a spurt loss is observed from 115° C. and no cake forms at 130° C.

Test No. 11: Influence of Temperature on a Clayless Solution of Gellan with Xanthan or Wellan in the Presence of a High CaCl$_2$ concentration.

| Temperature | 30 | 90 | 110 | 130 | 150 |
|---|---|---|---|---|---|
| * The aqueous solution contains 3 g/l of gellan, 4.5 g/l of xanthan and 50 g/l of CaCl$_2$. ||||||
| VFS | 0.071 | 0.139 | 0.177 | 0.201 | infinite |
| 30' | 7.8 | 16.1 | 22.4 | 109.0 | |
| 7.5' | 3.0 | 7.9 | 11.3 | 97.0 | |
| g0 | 18.0 | | | | |
| g10 | 22.0 | | | | |
| Cake | 0.5 | 1.0 | 1.0 | 0.5 | |
| VP | 12 | | | | |
| YV | 36 | | | | |
| * The aqueous solution contains 3 g/l of gellan, 4.5 g/l of wellan and 50 g/l of CaCl$_2$. ||||||
| VFS | 0.085 | 0.154 | 0.159 | 0.185 | 0.289 |
| 30' | 9.6 | 17.8 | 18.6 | 24.2 | 46.8 |
| 7.5' | 3.7 | 8.4 | 8.8 | 12.5 | 24.2 |
| g0 | 10.0 | | | | |
| g10 | 22.0 | | | | |
| Cake | 0.5 | 1.0 | 1.0 | 0.5 | 0.5 |
| VP | 22 | | | | |
| YV | 37 | | | | |

Notes

The spurt loss phenomenon is observed at higher temperatures than with scleroglucan, at 130° C. with xanthan and at 150° C. with wellan. At 130° C., no cake forms with xanthan.

At 30° C., these formulations show a marked shear thinning feature.

Test No. 12

These complementary tests have been carried out with clarified and deesterified commercial gellan (Gelrite).

The aqueous solution contains 20 g/l of clay and 2 g/l of Gelrite which has been solubilized by adding an EDTA or ethylene diamine tetraammonium type sequestering agent.

In a solution without salt, the 30' filtrate is 15 ml at ambient temperature.

In a saline solution, such as sea water, the 30' filtrate reaches a value of 275 ml.

Gelrite has much less capacities than native gellan notably because of its high sensitivity to salts.

We claim:

1. In a process used in a well drilled through at least one geologic formation having a certain permeability, said process comprising circulating a water-based fluid in said well, the improvement comprising adding a sufficient mount of gellan in said fluid to reduce filtration of said water-based fluid and control the permeability of the walls of said well drilled in said formation.

2. A process as claimed in claim 1, wherein said gellan comprises native gellan.

3. A process as claimed in claim 1, wherein said fluid contains between 0.5 and 10 grams per liter of gellan.

4. A process as claimed in claim 1, wherein the viscosity of said fluid is mainly controlled by adding a sufficient amount of at least one polymer.

5. A process as claimed in claim 4, wherein said polymer is selected from the group consisting of xanthan, scleroglucan, wellan, hydroxyethylcellulose (HEC), CMC, guar gum and a polyacrylamide.

6. A water-based drilling fluid having a viscosity less than 30 cp, containing native gellan in an mount effective to reduce filtration of the water-based fluid and at least one viscosity modifying polymer.

7. A fluid as claimed in claim 6, wherein said polymer is selected from the group consisting of xanthan, scleroglucan, wellan, hydroxyethylcellulose (HEC), CMC, guar gum and a polyacrylamides.

8. A fluid as claimed in claim 7, comprising between 0.5 and 10 grams/liter of gellan and between 1 and 10 grams/liter of scleroglucan or xanthan.

9. A process according to claim 2, wherein the gellan is mainly native gellan.

10. A process according to claim 3, wherein the fluid contains less than 5 g/liter of gellan.

11. A fluid according to claim 6, wherein the native gellan is part of a gellan mixture.

12. A fluid according to claim 11, wherein the gellan mixtures is mainly native gellan.

13. A filtrate reducing composition for water-based fluid having a viscosity less than 30 cp adapted to circulate through a well drilled through a geologic formation, said composition comprising an aqueous solution and an amount of gellan greater than 0.5 grams/liter and effective to reduce filtration of the water-based fluid and further comprising at least one viscosity modifying polymer.

14. A filtrate reducing composition as in claim 13, wherein said gellan comprises native gellan.

15. A filtrate reducing composition as in claim 13, wherein said gellan comprises a gellan mixture.

16. A filtrate reducing composition as in claim 15, wherein the gellan mixture is mainly native gellan.

17. A filtrate reducing composition as in claim 13, wherein the viscosity modifying polymer is selected from the group consisting of xanthan, scleroglucan, wellan, hydroxyethylcellulose (HEC),CMC, guar gum and a polyacrylamide.

* * * * *